(12) United States Patent
Brannon, Jr.

(10) Patent No.: US 8,055,783 B2
(45) Date of Patent: Nov. 8, 2011

(54) SYSTEMS AND METHODS FOR MEDIA STREAM PROCESSING

(75) Inventor: Robert H. Brannon, Jr., Dripping Springs, TX (US)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 1052 days.

(21) Appl. No.: 11/402,622

(22) Filed: Apr. 12, 2006

(65) Prior Publication Data

US 2007/0043875 A1    Feb. 22, 2007

Related U.S. Application Data

(60) Provisional application No. 60/710,350, filed on Aug. 22, 2005.

(51) Int. Cl.
G06F 15/16 (2006.01)

(52) U.S. Cl. .................. 709/231; 709/219

(58) Field of Classification Search .......... 709/231, 709/219
See application file for complete search history.

(56) References Cited

U.S. PATENT DOCUMENTS

| | | | |
|---|---|---|---|
| 5,510,842 A * | 4/1996 | Phillips et al. | 375/240.25 |
| 5,953,506 A * | 9/1999 | Kalra et al. | 709/231 |
| 6,097,422 A * | 8/2000 | Aref et al. | 725/94 |
| 6,549,948 B1 * | 4/2003 | Sasaki et al. | 709/233 |
| 6,944,160 B1 * | 9/2005 | Weiss et al. | 370/395.1 |
| 7,522,664 B1 * | 4/2009 | Bhaskar et al. | 375/240.01 |
| 2002/0036704 A1 * | 3/2002 | Kim et al. | 348/390.1 |
| 2003/0007663 A1 * | 1/2003 | Wixson et al. | 382/100 |
| 2003/0156534 A1 * | 8/2003 | Coulson et al. | 370/210 |
| 2003/0165325 A1 * | 9/2003 | Blair et al. | 386/75 |
| 2004/0028135 A1 * | 2/2004 | Monro | 375/240.16 |
| 2004/0218099 A1 * | 11/2004 | Washington | 348/571 |
| 2004/0240543 A1 * | 12/2004 | Faroudja | 375/240.01 |
| 2006/0010003 A1 * | 1/2006 | Kruse | 705/1 |
| 2007/0005503 A1 * | 1/2007 | Engstrom et al. | 705/59 |
| 2007/0058926 A1 * | 3/2007 | Virdi et al. | 386/68 |

OTHER PUBLICATIONS

Ebrahimi et al., "MPEG-4 Natural Video Coding—An Overview", http://www.chiariglione.org/mpeg/tutorials/mpeg-4_si/7-natural_video_paper/7-natural_video_paper.htm, printed from Internet Aug. 12, 2005, 38 pgs.

(Continued)

*Primary Examiner* — Philip Chea
*Assistant Examiner* — Eric W Shepperd
(74) *Attorney, Agent, or Firm* — Kinney & Lange, P.A.

(57) ABSTRACT

Systems and methods for processing streaming media by selectively removing a portion of the streaming media data, e.g., for storage and/or delivery over a computer network medium. The amount of data in a media stream itself may be selectively reduced for delivery and/or storage and, in one exemplary embodiment, the amount of data in the media stream may be selected for delivery and/or storage so that it is reduced in a manageable and substantially consistent fashion. In another exemplary embodiment, data within a media stream of a given temporal duration may be selected for delivery and/or storage in such a way that leads to a proportional increase in the maximum speed at which data from the given temporal duration of the media stream may be transmitted and reviewed while simultaneously providing the benefit of reducing overall storage capacity requirements. The disclosed systems and methods may be advantageously implemented with any type of streaming media and video transport technology that employs media streams that comprise multiple frames including, but not limited to, any type of streaming media that employs video compression technology.

13 Claims, 6 Drawing Sheets

OTHER PUBLICATIONS

Everything2, "An Introduction To Data Compression, MPEG Video, And DVD Technology", http://www.everything2.com/index.pl?node_id=1461424, labeled "May 14, 2003", printed from Internet Apr. 10, 2006, 5 pgs.

"Lost Frames", http://www.goldencode.com/company/software/nto/userman/lostframes.html, labeled "© 2000", printed from Internet Apr. 10, 2006, 5 pgs.

"I-Frame", Webopedia, http://www.webopedia.com/term/i/i_frame.html, printed from Internet Aug. 12, 2005, 3 pgs.

B-Frame, Webopedia, http://www.webopedia.com/term/b/b_frame.html, printed from Internet Aug. 12, 2005, 3 pgs.

P-Frame, Webopedia, http://www.webopedia.com/term/p/p_frame.html, printed from Internet Aug. 12, 2005, 3 pgs.

\* cited by examiner

SYSTEMS AND METHODS FOR MEDIA STREAM PROCESSING

This patent application claims priority to copending U.S. Provisional Patent Application Ser. No. 60/710,350, filed Aug. 22, 2005, and entitled "SYSTEMS AND METHODS FOR MEDIA STREAM PROCESSING" by Robert H. Brannon, Jr., the entire disclosure of which is incorporated herein by reference.

FIELD OF THE INVENTION

This invention relates generally to media streams, and more particularly to the processing of media streams.

BACKGROUND OF THE INVENTION

Media stream delivery is typically accomplished using a media source (e.g., a video camera or stream server) that provides a media stream (e.g., a video stream) over an intervening network to a client device, e.g., client viewing software that operates on a Personal Computer (PC). In the case of video stream technology, a video access component (usually a video stream server) is typically present between a video source and a client device, or is the sole video stream source for recorded video content. The video access component delivers the video stream to the client device. In the case of video stream delivery, it is possible that the video camera and stream server components may be one device. It is also possible that the video access component may deliver stored/recorded video content without a camera device.

Current media streaming technology uses real time protocols, such as Real-time Transport Protocol (RTP) to transport data at a real time rate to a client mechanism that presents the media to a user at the real time rate. In order to present one minute's worth of media to a client, one minute's worth of data is transported in one minute using one "unit" of bandwidth (i.e., a "unit" is usually some corresponding bit rate value). By definition, the speed of this process is 1× (1 minute of media/1 minute to deliver). In some industries, such as the security and surveillance industries, their exists the need to review media streams faster than real time. Using conventional technology, additional bandwidth "units" are required to review more than one minute of data in one minute. For example, to review four minutes of data in only one minute, four minute's worth of data is sent in one minute using four "units" of bandwidth. This process is known as '4×' (4 minutes of media/1 minute to deliver). Thus, for conventional media streaming technology, the "cost" of extra speed is additional bandwidth. Furthermore, using conventional technology a problem is soon encountered where enough bandwidth does not reasonably exist to transmit a given media segment at faster and faster speeds. The result is that an undesirably large amount of time is often required to review media of any significant duration when using conventional media streaming technology.

Current security industry practice is to deliver a MPEG-4 stream over an RTP transport. A 4-SIF format image (usually 640H×480V) stream delivered at 30 frames per second (fps) typically requires 2-5 MBits per second (Mbps). RTP offers a speed parameter as part of the "PLAY" command that instructs a compliant server to deliver the streamed content as some rate faster. For example, if the "PLAY" parameter is issued with a parameter of "speed=4.0", the aforementioned 2-5 Mbps stream is now delivered four times faster (4×), requiring 8-20 Mbps. While this has the desired effect of getting the video to the client system faster, it also has the side effect of taking up more bandwidth as described above. Furthermore, even with four times increase in video stream delivery speed, 24 hours of video still requires 6 hours to download and view. Although this time may be reduced by requesting even faster playback rates, increasing the playback speed increases the required bandwidth usage of the stream. Eventually such increases in bandwidth become a limiting factor so that further increases in the speed of content delivery to the client are not possible, or feasible.

A further practical example of the shortcomings of current media stream delivery technology is to consider bandwidth requirements to deliver and review a high resolution full motion video stream at a speed of 60×. Using an MPEG-4 based codec, such a high resolution full motion video stream would nominally require 5 Mbps bandwidth for delivery. If this video stream were to be transported at a rate of 60×, the bandwidth required would be 5 Mbps*60×=300 Mbps. Such speeds are not possible on standard 100 Mbps networks, nor are they reasonable even for Gigabit networks which usually carry other forms of data traffic. To illustrate further, if useable bandwidth on a hypothetical network were limited to 10 Mbps of bandwidth to be utilized for moving this media stream, a maximum speed of 2× (10 Mbps/5 Mbps=2×) could be achieved. At this delivery rate, 30 minutes would be required to review one hour of this media stream, and roughly 12 hours would be required to review one day of this media stream. In a practical situation (such as upon occurrence of a crime or other significant event) where 24 hours of media from 4 different sources must be reviewed, it would take approximately 48 hours, or more than a standard work week, to accomplish this task.

SUMMARY OF THE INVENTION

Disclosed herein are systems and methods for processing streaming media (e.g., streaming video, streaming audio, etc.) by selectively removing a portion of the streaming media data, e.g., for storage and/or delivery over a computer network medium (e.g., via packet-based network, serial network, etc.). Using the disclosed approach, the amount of data in a media stream itself may be selectively reduced, in one exemplary embodiment, the amount of data in the media stream may be selected for delivery and/or storage so that it is reduced in a manageable and substantially consistent fashion. In another exemplary embodiment, data within a media stream of a given temporal duration may be selected for delivery and/or storage in such a way that leads to a proportional increase in the maximum speed at which data from the given temporal duration of the media stream may be transmitted and reviewed, e.g., at deterministic speeds per-stream, while simultaneously providing the benefit of reducing overall storage capacity requirements. The disclosed systems and methods may be advantageously implemented with any type of streaming media and video transport technology that employs media streams that comprise multiple frames including, but not limited to, any type of streaming media that employs video compression technology. In one exemplary embodiment, the disclosed systems and methods may be beneficially implemented for security and/or surveillance industry applications.

In one embodiment of the disclosed systems and methods, at least a portion of streaming media data may be removed from an original media stream of a given temporal duration prior to providing the remaining portion of the original media stream as an altered media stream of reduced data size but of substantially the same given temporal duration to a computer network medium for delivery, e.g., to a media stream client.

Although the disclosed systems and methods may be implemented to deliver any type of media stream, an altered video stream of reduced data size may be so delivered in one exemplary implementation to a viewing client for display to a user or observer. By displaying video image data from the altered video stream, the observer may be enabled to review video images covering the entire temporal duration of the original video stream (e.g., covering a given sequence of recorded events or events observed by a video image source in real time) but with some of the video image data removed. This means that the entire temporal duration of the altered video stream may be delivered and displayed using less bandwidth than would be required to deliver the entire original video stream. However, although some of the video image data is absent from the altered video stream, an observer may nevertheless be enabled to observe the gist of the original sequence of events (with some details missing) without significant impact in a manner similar to watching fast forward video on a VCR or DVD player.

The disclosed systems and methods may be advantageously implemented in one embodiment to manipulate streaming media in a manner that reduces media stream delivery bandwidth and/or media stream storage requirements for a given temporal duration of streaming media. In such an embodiment, the disclosed systems and methods may be so employed to enable increased speed of delivery of a media stream without an increase in associated bandwidth, and/or to increase the temporal duration of media stream data that may be stored on a device/s capable of handling streaming media (e.g., video stream server, video-on-demand server, multimedia archive system, etc.). Thus, in situations where bandwidth and/or storage capability is limited, the disclosed systems and methods may be implemented to increase archival playback rates for a given bandwidth or storage capacity. For example, given a 4 Mbps MPEG-4 video stream, the equivalent of a conventional 60× video stream delivery speed may be achieved by delivering selected frames from the video stream over a 4 Mbps bandwidth, e.g., so that video stream data selected to represent a 24 hour temporal duration of the video stream data from a single source may be delivered for presentation in about 24 minutes (corresponding to 24 hours*1 source/60×=0.4 hour if delivered by a conventional 60× video stream) or so that video stream data selected to represent a 24 hour temporal duration from four different sources may be delivered for presentation in about 1.6 hours (equivalent to 24 hours*4 sources/60×=1.6 hours if delivered by conventional 60× video stream).

In one exemplary embodiment, the disclosed systems and methods may be implemented as follows. A user may request a media stream (e.g., video stream) be delivered at an increased rate of delivery, i.e., delivered at a speed greater than real time. In response to this user request, a FILTER (i.e., a parameterized piece of logic that imposes processing criteria) may be applied to the media stream to only allow selected media stream frames (e.g., key frames) to pass through for delivery to the user. Using the methodology of this exemplary embodiment, such a filter may be implemented to have the effect of removing selected frames of the media stream content from delivery and, in doing so, reducing the bandwidth required to transmit a given temporal duration of the media stream at the user-requested increased rate of delivery. In the case of a video stream, a human observer cannot typically comprehend all of the video frames of a conventional video stream that are delivered and presented for viewing at a rate faster than real time. Therefore, using the disclosed systems and methods, not all of the frames of a given video stream are necessary or required to be presented for viewing in order for the observer to satisfactorily review the content of a given video stream that is presented at faster than real time, e.g., for security or surveillance purposes. For some fast rates of delivery, an observer of such a video stream may not notice an appreciable loss of data. Thus, in one exemplary embodiment, the disclosed systems and methods may be implemented in a manner that reduces the temporal fidelity of the delivered video stream, without reducing the spatial fidelity of the video stream.

The disclosed systems and methods may be implemented in one embodiment as a media stream filter system that is configured to reduce the amount of data in an original media stream to produce an altered media stream of reduced data size. Such a media stream filter system may be advantageously implemented with one or more media stream sources, media stream clients or other devices in any suitable configuration, e.g., integrated with a media stream source, coupled as a separate component between a media stream source and a media stream client, integrated with a media stream client, etc. In one exemplary embodiment for video stream delivery, a video access device may be provided that includes a video stream filter integrated therein.

In one respect, disclosed herein is a method for processing streaming media, including selectively removing a portion of streaming media data from the streaming media to form an altered media stream of reduced data size. The method may further include providing the altered media stream to a computer network medium, providing the altered media stream for storage, or a combination thereof.

In another respect, disclosed herein is a streaming media processing system including a media stream filter, the media stream filter being configured to selectively remove a portion of streaming media data from the streaming media to form an altered media stream of reduced data size. The streaming media processing system may be further configured to provide the altered media stream to a computer network medium, to provide the altered media stream for storage, or a combination thereof.

In another respect, disclosed herein is a method of delivering a video stream, including: filtering at least one original video stream using a video stream filter to form an altered video stream; and providing the altered video stream from a video access component.

In another respect, disclosed herein is a video delivery system, including: a video access component; and a video stream filter.

DESCRIPTION OF ILLUSTRATIVE
EMBODIMENTS

The disclosed systems and methods may be implemented to process any type of original media stream, e.g., for storage and/or delivery across a computer network medium, including both compressed and uncompressed media streams. Examples of compressed media streams include key-frame based media streams, i.e., media streams that employ key frames. In this regard, many types of modern compression codecs and their associated streams employ two types of frames that will be referred to herein as key frames and dependent frames. Key frames are those complete frames of a media stream in compressed form that have meaning outside the context of other frames and that are capable of being processed autonomously without association with other frames from the media stream. Dependent frames are those incomplete frames of a media stream that are "delta frames" to some other referenced frame/s of the media stream. In operation, dependent frames may be interspersed with key frames in a compressed media stream. Specific examples of compressed video stream protocols include, but are not limited to, MPEG-1, MPEG-2, MPEG-4, H.261, H.263, H.263+, H.264, etc.

For example, in the MPEG-4 video stream codec, a video stream may be made up of three types of frame entities known as Video Object Planes (VOPs): independent VOPs (I-VOPs), predicted VOPs (P-VOPs), and bidirectional VOPs (B-VOPs). These VOPs will typically occur in sequences starting with an I-VOP and followed by some number of P-VOPs and B-VOPs. Each of these sequences, is referred to as a Group of Video Object Planes (GOV). Of the three types of MPEG-4 VOPs, I-VOPs are frames that have meaning outside of the context of other VOPs (i.e., I-VOPs may be encoded and decoded independent and outside the context of other VOPs) while P-VOPs and B-VOPs are frames that are only useful for predicting VOPs when present in a particular sequence relative to other VOPs (i.e., P-VOPs and B-VOPs may only be predicted or interpolated relative to other VOPs). As such, I-VOPs are key frames as they can be processed autonomously and don't need to be associated with other VOPs from a stream, and P-VOPs and B-VOPs are dependent frames as they may only be interpreted relative to other frames (i.e., data from other related frames is required in addition to a dependent frame in order to reconstruct the complete image).

Key frames are also present in other video stream protocols (e.g., MPEG-1, MPEG-2, H.261, H.263, H.263+, H.264, Motion JPEG, Wavelets, etc.) as Intra-frames (I-frames) which are processed (e.g., encoded and decoded) in a manner similar to I-VOPs of the MPEG-4 protocol. Dependent frames are present in such other video stream protocols as "Inter-frames" or "Delta frames". Examples of such dependent frames include interpredictive frames (P-frames) and Bidirection predictive frames (B-frames) which are processed (e.g., encoded and decoded) in a manner similar to P-VOPs and B-VOPs of the MPEG-4 protocol, respectively. In this regard, a P-frame follows an I-frame and contains only data changed from the preceding I-frame (e.g., content and color changes), relying on the I-frame to provide most of the data. A B-frame depends on frames that precede and follow the B-frame, and contains only data that is different from data in the next successive frame, or data that is changed from the preceding frame. Additionally, all of the aforementioned video compression protocols employ what is referred to as a Group of Video object planes (GOV) or a Group of Pictures (GOP). A GOP includes a data header that precedes some sequence of I-, P- and/or B-frames. In this regard, a GOP may encompass a set of video frames that share a specific timespan or are bounded within a set of video compression metrics.

Thus, as used herein a key frame (e.g., I-frame, I-VOP, etc.) of a media stream is a complete single frame of digital content in compressed form that may be processed (e.g., examined by a digital encoder/compressor or decoder/decompressor) in a manner independent of preceding and following frames, and for which an encoder/compressor may store all data necessary to present (e.g., display or play) the frame. Dependent frames (e.g., P-VOP, B-VOP, P-frame, B-frame, etc.) are incomplete frames of digital content that contain only data that has changed or that is different from another separate frame/s of the media stream. Table 1 below provides a listing of exemplary video compression protocols with which the disclosed systems and methods may be implemented, it being understood that it is possible that other video compression protocols may be employed, or that a video stream may be uncompressed. When implemented with standard compression protocols such as listed in Table 1, the disclosed systems and methods may advantageously employed to alter media streams to create an altered media stream that is still compliant (e.g., playable, transmittable, storable) with the original protocol.

TABLE 1

| Compression Protocol | Key Frames | Dependent Frames |
|---|---|---|
| MPEG-4 | I-VOP | P-VOP, B-VOP |
| MPEG-1, MPEG-2, H.261, H.263, H.263+, H.264, Motion JPEG, Wavelets | I-frame | P-frame, B-frame |

Figure 1:
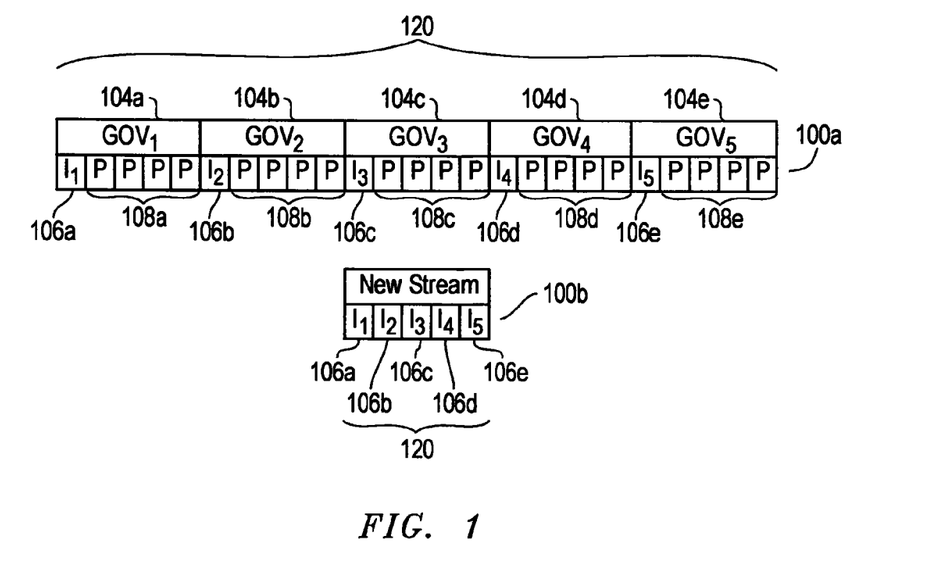
FIG. 1 illustrates an original media stream and an altered media stream according to one embodiment of the disclosed systems and methods.

The disclosed systems and methods may be implemented in one exemplary embodiment to process data of an original MPEG-4 compressed video media stream of a given temporal duration for delivery across a computer network medium to one or more client devices as an altered video media stream of reduced data size of substantially the same given temporal duration as the original compressed media stream. As an example, FIG. 1 illustrates frames of an original compressed MPEG-4 video stream 100*a* that has a real time frame rate of 30 frames per second (fps). As illustrated in FIG. 1, frames of original video stream 100*a* are grouped together as five separate GOVs 104*a* to 104*e*, with each GOV including one independent frame (I-VOP) 106 and a group of four predictive frames (P-VOPs) 108, although it will be understood that bidirectional VOPs (B-VOPs) may also be present with or without P-VOPs within one or more GOVs. In this embodiment, the five GOVs together represent a given real time temporal duration 120, meaning frames of GOVs 104*a* to 104*e* cover a given period of real time (e.g., cover a given sequence of events observed in the given period of real time by an image source).

In order to create an altered video stream of reduced data size from an original video stream such as stream 100a of FIG. 1, any one or more frames of data may be removed or filtered (e.g., using filter system 500 of FIG. 5 described below) from the original video data stream, for example, prior to delivery of the altered video stream across a computer network medium and/or prior to archival on a storage medium. In this regard, any methodology for removing one or more frames of data from the original video stream may be employed, including removal of all dependent frames (i.e., transmission of only key frames), removal of entire groups of frames (i.e., removal of entire GOVs or GOPs), combinations thereof, etc. For example, it is possible to alter an original MPEG-4 video stream so that it only includes I-VOPs (i.e., by removing all B-VOPS and P-VOPs from the original video stream), or so that it only includes VOPs from certain GOVs (i.e., by removing entire GOVs from the original video stream), or so that it only includes I-VOPs from certain GOVs (i.e., by removing entire GOVs from the original video stream and by removing all B-VOPS and P-VOPs from the remaining GOVs). It will be understood that the foregoing are examples only and that any other methodology may be employed to remove one or more frames from an original video stream to form an altered video stream of reduced data size.

In one exemplary embodiment, four media stream alteration parameters (Play, Skip, Mode and Rate) may be employed to define a given methodology for creating an altered (i.e., sampled) media stream of reduced data size from an original media stream. Such parameters may be implemented or controlled, for example, by extending the Real Time Streaming Protocol (RTSP) Uniform Resource Locator (URL) or any other protocol suitable for passing the media stream alteration parameters (e.g., such as via additional 'headers' in an RTSP or HTTP message, a simple parameter or control message, etc.) suitable for a particular media stream. These exemplary parameters may be employed for example, by a client device (e.g., client device 630 of FIGS. 6 and 7 described below), to request an altered media stream having particular characteristics for delivery to the client device. Four exemplary media stream alteration parameters of this embodiment are listed below (it being understood that in other embodiments other suitable parameters may alternatively or additionally be defined and employed):

Play—The number of consecutive frame groups (e.g., GOVs) from the original media stream to include in the altered media stream before the skip parameter (see below) is invoked. In one exemplary embodiment, the "Play" parameter may have a minimum value of 1 and an arbitrary maximum value of 4,294,967,295 ($2^{32}-1$), with the default value being set to equal 1.

Skip—The number of consecutive frame groups (e.g., GOVs) from the original media stream to exclude or skip from the altered media stream after the play parameter is invoked. In one exemplary embodiment, the "Skip" parameter may have a minimum value of 0 and an arbitrary maximum value of 4,294,967,295 ($2^{32}-1$), with the default value being set to equal 0 (a value of zero may be defined to indicate that no frame groups of the original media stream should be excluded or skipped).

Mode—Specifies which frames of an included frame group (see "Play" and "Skip" parameters above) should be included in the altered media stream. In one exemplary embodiment, a value of 0 (zero) may be defined to indicate that all frames of an included frame group (e.g., all VOPs of a GOV) are to be included in the altered media stream for delivery to the client. A value of 1 (one) may be defined to indicate that only the first or key frame (e.g., I-VOP) of an included frame group (e.g., GOV) is to be included in the altered media stream. A value of 2 (two) may be defined to indicate that only the first or key frame (e.g., I-VOP) of the first included frame group (e.g., GOV) is to be included in the altered media stream for delivery to the client (i.e., delivery of the altered media stream is terminated after delivery of the first I-VOP). In this regard, "Mode 2 (two)" may be employed, for example, by a client in order to request a single frame over an RTP stream. The above described "Mode" values are summarized in Table 2 below, it being understood that these values are exemplary only, and that fewer, additional, or alternative "Mode" values may be defined as desired or needed to fit the characteristics of a given media stream delivery application.

TABLE 2

| Mode | Behavior |
|---|---|
| 0 (zero) | The entire contents of the frame group should be delivered to the client |
| 1 (one) | Only the first key frame of a frame group should be delivered to the client |
| 2 (two) | Only the first key frame of the original media stream should be delivered to the client |

Rate—The absolute frame rate at which an altered stream should be delivered, e.g., to a client device requesting the altered media stream. The units employed for the "Rate" parameter may be expressed as frames per second (e.g., VOPs per second), or using any suitable alternative units. In one embodiment, the "Rate" parameter may be used to control required media stream bandwidth. For example, the same real time frame rate as the original media stream may be chosen in order to maintain the same bandwidth requirement for delivery of the higher speed altered media stream to the client as would be required for delivery of the original media stream at its real time rate. Alternatively, a lower frame rate than the original media stream may be chosen in order to reduce bandwidth required for delivery of the altered media stream, or a higher frame rate than the original media stream may be chosen in order to further increase delivery speed of the altered media stream, i.e., with a higher bandwidth requirement associated with delivery of the altered media stream. In one exemplary embodiment, the "Rate" parameter may have a minimum value of 0 fps, a maximum value of 240 fps, and may be set to default to an altered stream delivery rate equal to the nominal or original frame rate of the original (i.e., pre-sampled) media stream whenever the "Rate" value is set to 0 (zero) or is not specified.

In one exemplary embodiment, the media stream alteration parameters may be implemented using an RTSP URL, e.g., as lower case strings followed by a decimal value. In such an embodiment, the decimal value may be parsed and used as the value for the specific parameter. For example, the following RTSP URL may be used to request that 1 GOV is played, 0 GOVs are skipped, all of a GOV is played, and the stream is delivered at the nominal stream rate. In other words, this is the existing behavior of the archive streams:

rtsp://<standard URL and existing params>&play=1&skip=0&mode=0&rate=0

Returning now to the exemplary embodiment of FIG. 1, an altered video stream 100b is shown in which the first I-VOP from every GOV is streamed at a rate of 30 fps. Using the methodology described above, the altered video stream of this embodiment may be based, for example, on the following set of media stream alteration parameters: Play=1, Skip=0, Mode=1, and Rate=30 fps. Accordingly, altered stream 100*b* only includes I-VOPs 106 of original video stream 100*a*, i.e., P-VOPs 108 of original video stream 100*a* have been removed to create altered video stream 100*b* that only includes I-VOPs 106 that may be sent across a computer network medium to one or more client device/s. Although frames of data (i.e., P-VOPs 108) have been removed from original video stream 100*a*, I-VOPs 106 of altered video stream 100*b* cover substantially the same temporal duration 120 as covered by original video stream 100*a*. Thus, in this embodiment, by skipping the P-VOPs 108 and only transmitting I-VOPs 106 across the network as altered video stream 100*b* to a client device, a significant reduction in transmitted data and resulting network bandwidth to deliver a video stream of substantially the same temporal duration 120 may be achieved by sacrificing the temporal fidelity of the video sequence, while at the same time retaining spatial fidelity and temporal duration 120 of the original video stream.

Still referring to FIG. 1, the temporal delivery speed of the altered video stream 100*b* may be varied by selecting an appropriate value for the "Rate" parameter. For example, when a "Rate" parameter is selected that is equal to the original frame rate of the original video stream as described above, greater than real time media stream delivery speed may be achieved for altered video stream 100*b* without an increase in required network delivery bandwidth as compared to bandwidth required to deliver original video stream 100*a* at real time speed. Alternatively, it is possible to deliver altered video stream 100*b* at a lower frame rate (i.e., by selecting an appropriately lower "Rate" parameter) so that a video stream of substantially the same temporal duration 120 may be delivered at a real time speed (or any other desired speed) with a significant reduction in transmitted data and resulting network delivery bandwidth required as compared to bandwidth required for real time delivery of original video stream 100*a*. Thus, it will be understood that media stream alteration parameters, such as "Rate," may be selected or varied as needed or desired to fit the requirements of a given media stream delivery application.

For example, to further illustrate how media stream delivery bandwidth requirement may be reduced using the methodology of FIG. 1, consider an original 4 Mbps MPEG-4 video stream 100*a* in which an I-VOP occurs on average once every 30 frames (i.e., all GOVs of a common video stream do not have to contain the same number of VOPs or frames). Assuming that an observer desires to review the contents of this video stream 100*a* at a speed of 30× (30 minutes of media/1 minute to delivery) using conventional methodology, the calculated bandwidth required to delivery the original video stream across a computer network medium would be 4 Mbps*30×=120 Mbps. However, the disclosed systems and methods may be implemented to process the original 4 Mbps video stream 100*a* to create altered video stream 100*b* of reduced data size for transmittal across the computer network medium. This may be done as described above by removing all non-I-VOPs (i.e., P-VOPs and B-VOPs) from the original video stream 100*a* so that the altered video stream 100*b* only includes the I-VOPs of the original video stream 100*a*. Since in this example the I-VOPs make up 1/30 of the original stream, effectively 29/30 or 96% of the original stream (temporally) is eliminated. Thus, the bandwidth required to transmit the altered video stream 100*b* across a computer network medium to a client is 4 Mbps (data transmission rate of altered stream)*30× (video speed relative to real time playback)*1/30 (fraction of video stream data remaining in altered stream), or approximately 4 Mbps without sacrificing spatial fidelity. Therefore, in this exemplary embodiment, the disclosed systems and methods may be employed to transmit the altered video stream 100*b* at a speed 30 times faster than real time using the same amount of bandwidth as required to transmit the original video stream 100*a* in real time.

In other embodiments of the disclosed systems and methods, key frames may also be removed or filtered out of an original encoded/compressed media stream. For example, if higher retrieval rates are desired than may be achieved using the embodiment of FIG. 1, key frames (e.g., I-VOPS) and entire frame groups (e.g., GOVs or GOPs) themselves may be removed. In the example of the preceding paragraph, a speed of 300× may be achieved (e.g., to allow review of an entire 24 hour period in under 5 minutes) by removing or filtering out all dependent frames from the original encoded/compressed video stream in addition to removal or filtering out of 9 out of 10 key frames (i.e., so that only 1 of 10 key frames pass through in the altered video stream.

If during display of the altered video stream of the preceding example, an observer notices something of interest in the stream, delivery of a higher temporal fidelity version video stream may be requested (e.g., by requesting delivery of an altered stream with different media stream alteration parameters or by requesting delivery of the original compressed video stream). In such a case, however, it should be noted that some of the stream data (frames) has already been sent to the observer in the previously delivered altered video stream. Thus to save bandwidth, temporal fidelity may be increased in one embodiment by only sending additional stream data (frames) that was removed from the previously delivered altered video stream. This may be implemented, for example, using an inverse filtering methodology in which all or a portion of the previously removed and missing frames are delivered for viewing by an observer, e.g., delivered by filter system 604 or 736 to a client device 630 of FIG. 6 or 7. These subsequently provided missing frames may be merged back into the previously provided altered media stream (e.g., using stream merge logic in a requesting client device) to form a reassembled video stream having higher temporal fidelity than the previously delivered altered video stream. If desired, all of the previously removed frames may be subsequently sent in this manner so that the reassembled video stream is identical to the original compressed video stream.

Returning to the last example in which an altered video stream has been delivered at a speed of 300×, it may be desired that a subset of the stream be subsequently reassembled to form a reassembled video stream that may be reviewed at a speed of 30×, e.g., so that an identified area of interest may be further examined by an observer by viewing a reassembled video stream that provides a 10 fold increase in temporal fidelity. Thus, a filter may be first applied to the original compressed video stream to remove all the non key frames and deliver an altered video stream containing 1 of 10 key frames, followed by subsequently applying an inverse filter to deliver a second altered video stream containing 9 of 10 key frames (the compliment of the 1 of 10 key frames used earlier) so that all of the key frames of the original compressed video stream may be reassembled for the observer.

Likewise, once the above reassembled 30× video stream is reviewed, it may be desired to retrieve the original full fidelity compressed video stream, e.g., to allow review of a specified segment of the original compressed video stream. An inverse filter may then be applied to filter out only the key frames, leaving all non-key frames in a third altered video stream that were originally filtered out in the previous altered video streams. This third altered video stream may be delivered and combined with the previously reassembled 30× stream to recreate the original compressed video stream. Advantageously, during this entire process no duplicate data is required to be delivered, e.g., across a computer network medium, thus helping to minimize network usage and associated bandwidth costs. Although the preceding discussion describes reassembly of video streams, it will be understood that similar methodology may be applied to any other type of media streams, and may be implemented whether the video streams are delivered across a computer network medium, sent to storage, or delivered in any other manner.

Figure 2:
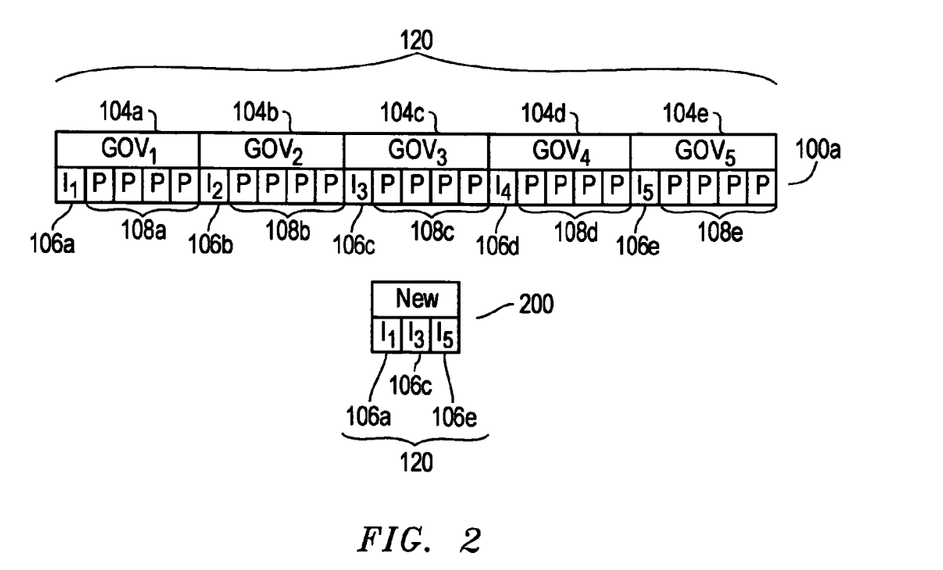
FIG. 2 illustrates an original media stream and an altered media stream according to one embodiment of the disclosed systems and methods.

As another example, FIG. 2 again shows frames of original compressed MPEG-4 video stream 100a. However, in this embodiment, an altered video stream 200 is shown provided in which the first I-VOP from every other GOV is streamed at a rate of 30 fps. The altered video stream of this embodiment may be based, for example, on the following set of media stream alteration parameters: Play=1, Skip=1, Mode=1, Rate =30. Thus, this example illustrates filtering of both key frames and groups of frames. Specifically in this case, the filter is setup to only allow key frames to pass and then only allow every other frame group to pass through. Since in this embodiment the size of the groups of frames averages to 5 frames per group, the filtering methodology of this embodiment results in a 10:1 frame compression ratio effectively.

Figure 3:
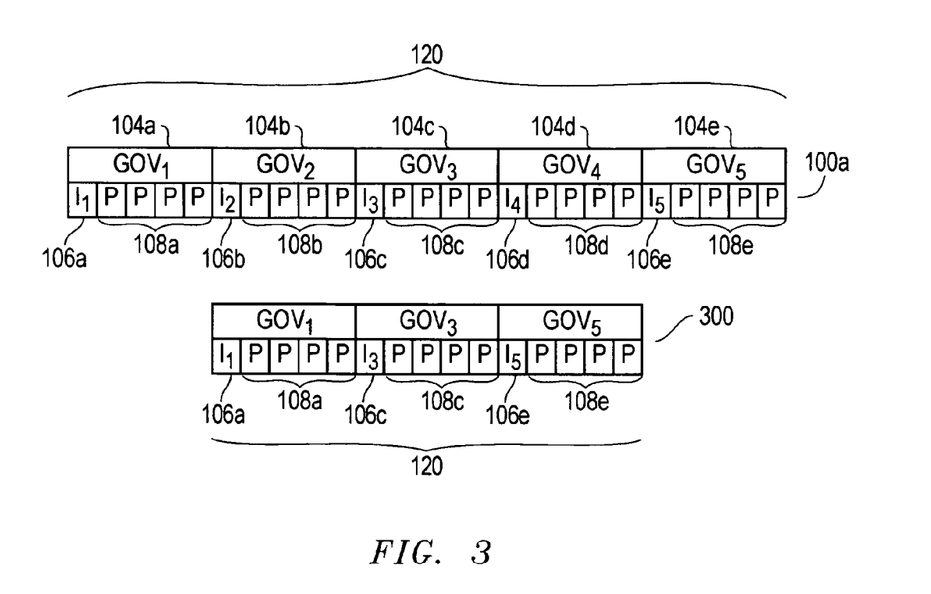
FIG. 3 illustrates an original media stream and an altered media stream according to one embodiment of the disclosed systems and methods.

FIG. 3 again shows frames of original compressed MPEG-4 video stream 100a. However, in this embodiment, an altered video stream 300 is shown provided in which all VOPs from every other GOV are streamed at a frame rate of 60 fps. As previously mentioned, one or more GOVs of an original video stream and resulting altered video stream may additionally or alternatively include bidirectional VOPs (B-VOPs). The altered video stream of this embodiment may be based, for example, on the following set of media stream alteration parameters: Play=1, Skip=1, Mode=0, Rate=30. As shown in FIG. 3, even faster data transfer rates may be achieved by skipping (i.e., removing) entire GOVs at a time. By removing every other GOV from original video stream 100a and delivering altered video stream 300 at the same frame rate as the original video stream 100a, the effective temporal playback speed may be doubled while only requiring the delivery bandwidth of the original stream 100a.

In another exemplary embodiment where there is an original 4SIF stream with a frame rate of 30 fps, a single I-VOP may be selected from every two GOVs of the original stream (i.e., one out of every two GOVs removed from the original stream and all frames except the I-VOP removed from the remaining GOV) and the resulting altered video stream sent at the equivalent rate of the original 30 fps stream. This is equivalent to selecting a frame from every two seconds of the original video stream, and then playing the resulting video stream back at 30 pfs. The resulting effect to an observer of the delivered stream is that of watching 2*30=60 seconds of video displayed in only 1 second, or effectively a 60 fold speed increase. This 60 fold increase may be accomplished using the same amount of bandwidth as the original 4SIF@30 fps stream.

Figure 4:
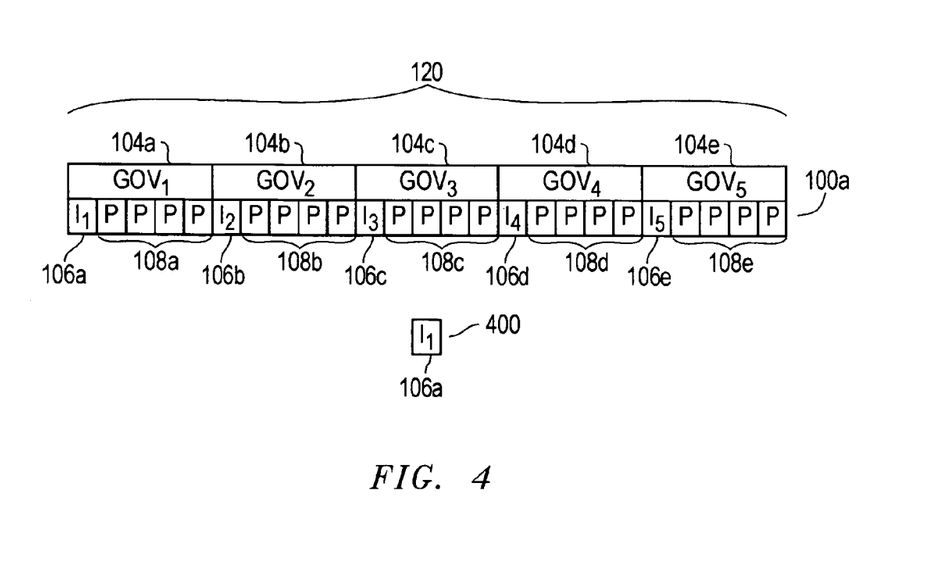
FIG. 4 illustrates an original media stream and an altered media stream according to one embodiment of the disclosed systems and methods.

FIG. 4 again shows frames of original compressed MPEG-4 video stream 100a. In this embodiment, an altered video stream 400 is shown provided in which only the first I-VOP of the first GOV is selected for streaming, e.g., to a client. The altered video stream of this embodiment may be based, for example, on the following set of media stream alteration parameters: Play=1, Skip=1, Mode=2, Rate=30. In this case, altered video stream 400 does not cover temporal duration of original video stream 100a, since altered video stream 400 includes only the first I-VOP of the first GOV of original video stream 100a.

Figure 5:
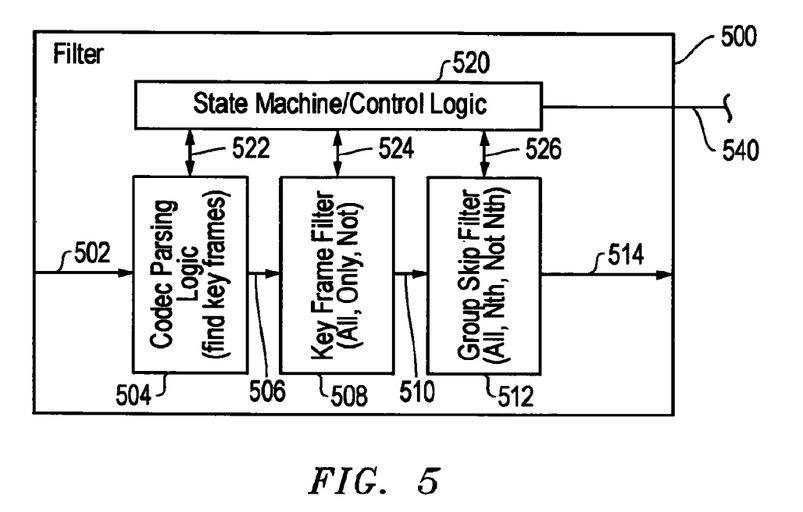
FIG. 5 is a simplified block diagram of a media stream filter system according to one exemplary embodiment of the disclosed systems and methods.

FIG. 5 shows one exemplary embodiment of a media stream filter system 500 that may be employed to produce an altered media stream 514 based on an original compressed media stream 502. As will be described further herein, a media stream filter system may be integrated as part of a video access component, as a stand-alone component, or implemented in any other configuration suitable for receiving an original media stream and producing an altered media stream therefrom. In this regard, Filter 500 may include any combination of hardware and/or software suitable for performing one or more tasks described elsewhere herein, e.g., one or more central processing units (CPUs) or microprocessors and optional memory configured to execute one or more tasks of Filter 500 as described further herein.

Although media stream filter system 500 of FIG. 5 is described herein in relation to an exemplary embodiment for producing an altered media stream from an original compressed media stream, it will be understood that a media stream filter system may also be configured and implemented for producing an altered media stream of reduced data sized from an original non-compressed media stream in addition to, or as an alternative to, from an original compressed media stream. In this regard, Codec parsing logic 504 (described further below) may be configured as needed or desired to fit the characteristics of a given application, e.g., configured to process incoming compressed media streams where required, or may alternatively be configured for non-compression based coding/decoding operations only.

As shown, media stream filter system 500 includes state machine/control logic 520 that is in communication with code/decode (Codec) parsing logic 504, key frame filter 508, and group skip filter 512. In this embodiment, codec parsing logic 504 may be present to find key frames within original media stream 502 (e.g., by parsing/identifying data structures, via data tags or other forms of identification within the protocol-dependent video stream), and to communicate the necessary resultant parameters 522 (e.g., frame types, data tags, data location/offsets, data size, buffer placement, data delimiters, etc.) to state machine/control logic 520. After processing original media stream 502, codec parsing logic 504 passes media stream 506 on to key frame filter 508 that is present to remove key frames from original stream 502 in a manner consistent with control instructions/parameters 524 received from state machine/control logic 520, and to provide the remaining frames as a filtered stream 510 to group skip filter 512. In this regard, media stream 506 may be identical to input media stream 502, or it may contain parameters, such as those that may be provided by control instructions/parameters 524 (or some subset or superset thereof) added or inserted by codec parsing logic 504 that aid or direct key frame filter 508 in performing its logic. Key frame filter 508 of this exemplary embodiment may be instructed to remove no key frames (i.e., to provide All key frames in filtered stream 510) or to remove one or more key frames (i.e., to provide Only certain key frames in filtered stream 510 or to Not provide certain key frames in filtered stream 510).

Still referring to FIG. 5, group skip filter 512 may be present to remove frame groups from filtered stream 510 in a manner consistent with control instructions/parameters 526 received from state machine/control logic 520, and to provide the remaining frames as a altered media stream 514. In this regard, group skip filter 512 of this exemplary embodiment may be instructed to remove no frame groups (i.e., to provide All frame groups in altered stream 514) or to remove one or more Nth frame groups (i.e., to provide Only certain Nth frame groups in altered stream 514 or to Not provide certain Nth frame groups in altered stream 514). It will be understood that the system configuration of FIG. 5 is exemplary only, e.g., the logical processing order of key frame filter 508 and skip filter 512 may be inverted so that media stream 506 is processed by group skip filter 512 prior to processing by key frame filter 508.

State machine/control logic 520 of FIG. 5 may be configured in any manner suitable for implementing one or media stream alteration parameters (e.g., Play, Skip, Mode and Rate parameters described above), and for receiving data stream parameters associated with the media stream input (e.g., frame types, data tags, data location/offsets, data sizes, buffer placement, data delimiters, etc.) to codec parsing logic 504 via interface 522 useful for performing subsequent processing logic, and for providing control instructions/parameters 524 and 526 described above. As shown, state machine/control logic 520 may be optionally coupled to receive data stream alteration parameter information 540 via network interface, serial port or any other input suitable for receiving information to set data stream alteration parameter values. In this regard, such media stream alteration parameters may be implemented or controlled in one embodiment using an RTSP URL or any other suitable protocol information, e.g., as may be received from a client across a computer network medium, or using any other suitable methodology. It will be understood that the configuration of media stream filter system 500 is exemplary only, and that any other combination of hardware and/or software suitable may be implemented for producing an altered media stream from an original stream. State Machine/control logic 520 may also be implemented solely as a set of reference parameters and variables used by codec parsing logic 504, key frame filter 508 and group skip filter 512 for performing their processing logic.

Figure 6:
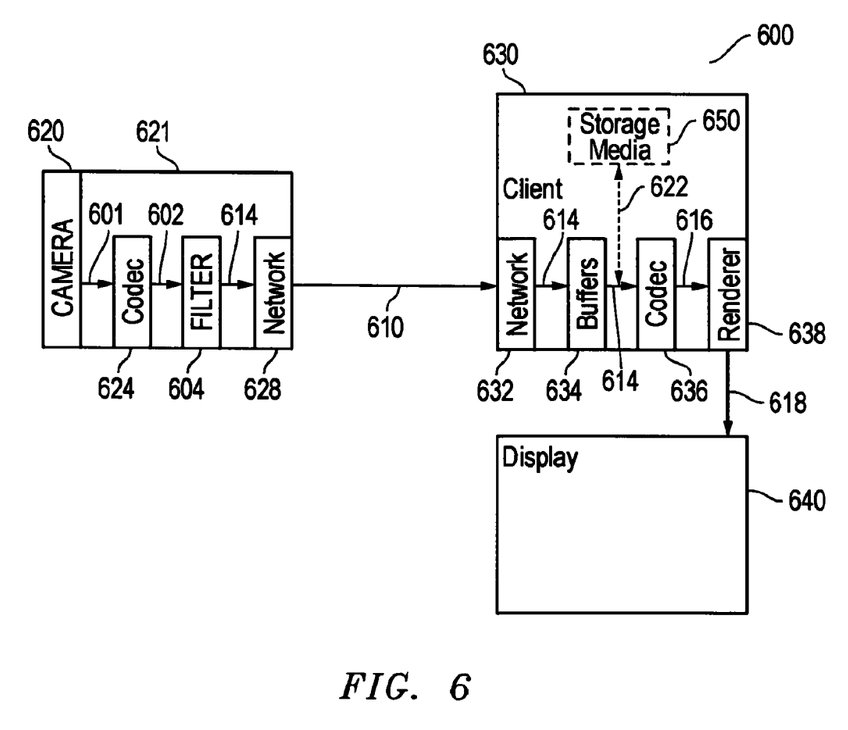
FIG. 6 is a simplified block diagram of a video delivery system according to one embodiment of the disclosed systems and methods.

FIG. 6 shows a video delivery system 600 as it may be configured according to one embodiment of the disclosed systems and methods. In this exemplary embodiment, video delivery system 600 includes a video source component or video source device (VSD) 620, a video access component 621, a viewing client 630 and a video display component 640. With regard to this and other embodiments described herein, it will be understood that the various media stream delivery system components may be coupled together to communicate in a manner as described herein using any suitable wired or wireless signal communication methodology, or using any combination of wired and wireless signal communication methodologies. Therefore, for example, network connections utilized in the practice of the disclosed systems and methods may be suitably implemented using wired network connection technologies, wireless network connection technologies, or a combination thereof.

As shown in FIG. 6, video source component 620 (e.g., digital camera) and video access component 621 are integrated together in this exemplary embodiment as a single device, although this is not necessary. In the embodiment of FIG. 6, video source component 620 and video access component 621 may be further characterized as being "closely coupled", e.g., image hardware components of video source component 620 may be directly coupled to provide digital signals to integrated video access component circuitry of video access component 621 via bus, high speed serial link, etc. In the exemplary embodiment of FIG. 6, video source component 620 is a digital video camera and video access component 621 may be configured as a digital video stream server, however it will be understood that in other embodiments a video source may be any other type of device (e.g., analog video camera, digital video recorder, digital video tape deck, streaming media server, video-on-demand server, etc.) that is suitable for producing one or more digital or analog video streams.

Furthermore, a video access component may be any device (e.g., digital video encoder, analog-to-digital encoder, analog-to-digital video recorder, proxy streaming server/cache, etc.) that is suitable for receiving analog and/or digital video stream information from one or more video sources, and for generating or otherwise providing a single digital video stream, or for providing multiple digital video streams (e.g., of different rates and/or resolutions), that are based on the received video stream information and communicating these digital video stream/s across a computer network medium (e.g., via packet-based network, serial network, etc.). It will also be understood that a separate signal conversion component may be present to convert an analog video stream received from an analog video source to a digital video stream for communication across a computer network medium.

Besides media stream filter circuitry, a video access component may include circuitry (e.g., digital video encoder circuitry, analog-to-digital encoder circuitry, analog-to-digital video recorder, proxy streaming server/cache circuitry, etc.) that is suitable for receiving analog and/or digital video stream information from one or more video sources, and for generating or otherwise providing a single digital video stream, or for providing multiple digital video streams (e.g., of different rates and/or resolutions), that are based on the received video stream information and communicating these digital video stream/s across a computer network medium (e.g., via packet-based network, serial network, etc.). It will also be understood that a separate signal conversion component may be present to convert an analog video stream received from an analog video source to a digital video stream for communication across a computer network medium. Additionally, a video access component may include circuitry, for example, to perform advertisement of stream attributes, to perform session management tasks, and to implement video stream protocols. In this regard, examples of video access components include, for example, devices that include circuitry to take analog input signals and convert them to digital formats and which may also encode signals using any suitable format/protocol (e.g., known video compression format/protocols), as well as devices of any configuration that include circuitry capable of converting/transcoding (e.g., frame rate adaptation and/or scaling) or forwarding video streams in either a raw, encoded, or compressed form.

It will be understood that a media stream filter need not be implemented as part of a video access component present between a given video source/s and a viewing client, and that one or more altered media streams may be provided from a media stream filter to a viewing client over one or more network connections in any alternative suitable manner. Furthermore, it is not necessary that an altered media stream be transmitted to a client device (or to any other type of device) across a computer network medium. For example, a media stream filter may be implemented in conjunction with a client device or stand alone device (e.g., as a media stream filter that is integrated into a client device or stand-alone device), for example, in order to provide an altered media stream for storage within such devices without ever requiring that the altered media stream be transmitted across a computer network medium. Furthermore, the media stream filtering tasks of a video access component described herein (as well as other possible video access component functions such as session management) may be logically implemented in any suitable configuration, whether it is as a stand alone device or system, integrated component of another device or system, or implemented by more than one device or system. It is also possible that more than one filter may be active per media stream (e.g., a filter for transmission over a compute network medium and another filter for recording to a storage medium).

Still referring to FIG. 6, video access component 621 is coupled to receive video image data 601 from video source component 620. As shown, video access component 621 includes code/decode circuitry 624 that encodes and compresses raw video image data 601 into an original compressed video stream 602 (e.g., using any suitable compression protocol such as MPEG-2, MPEG-4, H.263, H.264, etc.) that is provided to video stream filter circuitry 604 that may be configured to process compressed video stream data in a manner, for example, as described and illustrated in relation to FIG. 5 or using any other suitable configuration for producing an altered video stream of reduced data size. Video stream filter circuitry 604 then provides at least one altered video stream 614 to network interface component 628 that may be present to perform network interface tasks such as code conversion, network protocol conversion, etc. In this regard, network interface component 628 may be configured to communicate altered video stream/s 614 across computer network medium 610, to a viewing client 630. Network medium 610 may be a packet-based network (e.g., TCP/UDP/IP, IPX/SPX, X.25, etc.), or a serial network (e.g., ISDN, DS0/DS1/DS3, SONET, ATM, etc.).

As shown in FIG. 6, viewing client 630 is in turn configured to receive and process altered video stream/s 614 communicated across computer network medium 610 from video access component 621, and to provide video image data 618 based on altered video stream/s 614 to video display component 640, e.g., as one or more windows for viewing by a user on video display component 640. In the illustrated embodiment, network interface component 632 of viewing client 630 is coupled to receive altered video stream/s 614 from network medium 610 and may be present to perform network interface tasks such as de-packetization, buffering, network protocol tasks, etc. In this embodiment, viewing client 632 also includes buffer logic (e.g., circuitry, software, firmware) 634 and Codec logic (e.g., circuitry, software, firmware) 636 that processes altered video stream 614 and provides it to video renderer 638 via the uncompressed video stream 616. Video renderer 638 is in turn configured to provide video image data 618 based on uncompressed video stream 616 (as provided by Codec 636 from processed altered video stream 614) for display on display component 640.

As shown in dashed outline in FIG. 6, viewing client 630 may be optionally provided with Storage Media component/logic 650 that includes physical storage media and that is coupled to receive altered video stream 614 across interface 622 (e.g., memory, bus, or I/O interface), based on configuration or user command, and to store video stream 614, either in part, or as a whole, on the physical storage media managed by Storage Media component/logic 650. When Storage Media component/logic 650 is so present, it is also possible for prior stored altered video streams to be re-played from physical storage media controlled by Storage Media component/logic 650, based on user commands or via configuration, back across interface 622 to Codec 636. In such an implementation, the recorded altered video stream may then be processed by Codec 636 and sent in its uncompressed form 616 to video renderer 638 for eventual display.

It will be understood that viewing client 620 may include any combination of hardware and/or software suitable for performing one or more tasks described elsewhere herein, e.g., one or more central processing units (CPUs) or microprocessors and optional memory configured to execute one or more tasks of components 632, 634, 636 and 638. In one exemplary embodiment, viewing client 620 may be a PC-based workstation coupled as network node to network 610, and video display component 640 may be a computer monitor coupled to the PC-based workstation.

Figure 7:
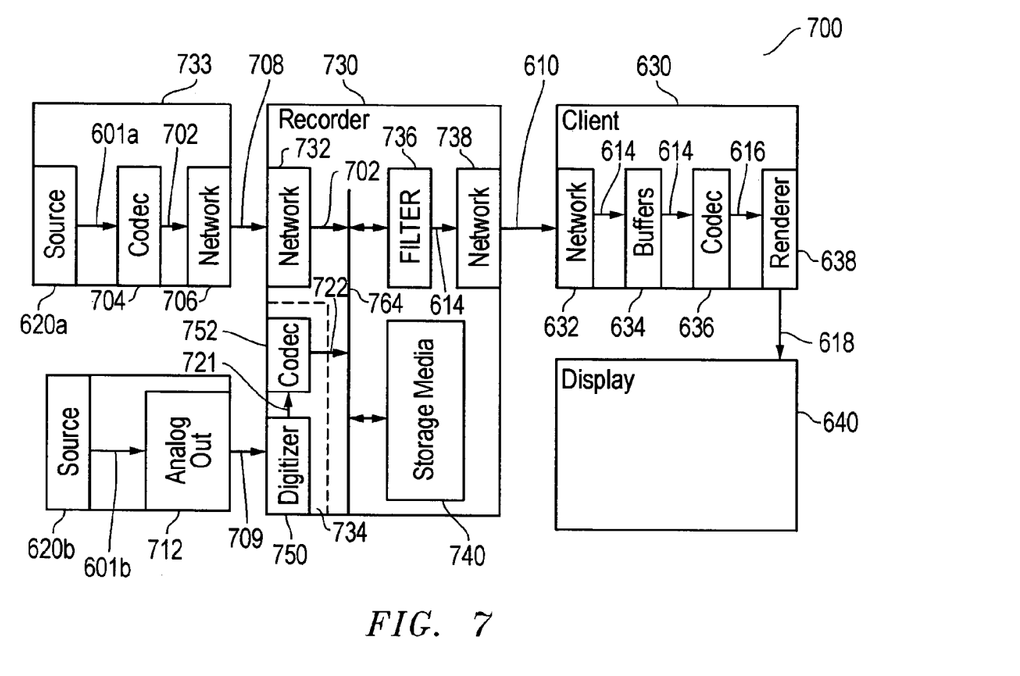
FIG. 7 is a simplified block diagram of a video delivery system according to one embodiment of the disclosed systems and methods.

FIG. 7 shows illustrates a video delivery system 700 as it may be configured according to another embodiment of the disclosed systems and methods. In this exemplary embodiment, video delivery system 700 includes two separate video source components 620a and 620b, video access components 733 and 734, digital video recorder (DVR) 730, viewing client 630, and display component 640. In this exemplary embodiment, video source component 620a (e.g., digital camera) is integrated with video access component 733 that includes Codec 704 and network interface component 706 that may be present to perform network interface tasks such as code conversion, network protocol conversion, etc. As shown, video source component 620a is coupled to deliver at least one digital video stream 601a to Codec 704 that, among other things, may compress data of digital video stream 601a (e.g., using any suitable compression protocol such as MPEG-2, MPEG-4, H.263, H.264, etc.) and provide it as a first original compressed video stream 702 to network interface component 706, which in turn is configured to communicate first original compressed video stream 702 across computer network medium 708 to network interface component 732 of digital video recorder 730. Network medium 610 may be a packet-based network (e.g., TCP/UDP/IP, IPX/SPX, X.25, etc.), or a serial network (e.g., ISDN, DS0/DS1/DS3, SONET, ATM, etc.), and network interface component 732 may be present to perform network interface tasks such as code conversion, network protocol conversion, etc. In this regard, network interface component 732 may be configured to communicate first original compressed video stream 702 to storage media 740 (e.g., hard drive, solid state memory, optical disk, etc.) and/or video stream Filter system 736 via internal bus 764 of DVR 730 as will be described further herein. It will be understood that FIG. 7 is exemplary only, and that computer network medium 708 may be any suitable computer network medium, e.g., switched or shared network connection, dedicated connection, etc.

Still referring to FIG. 7, analog video source 620b (e.g., analog video camera) is coupled to deliver at least one analog video stream 601b (e.g., as a standard composite video stream) to an analog input of analog to digital converter (ADC) 750 of video access component 734 (i.e., in this embodiment integrated with digital video recorder 730) via analog output 712 and respective dedicated analog signal connection 709, as shown. ADC 750 of video access component 734 is in turn configured to digitize data of analog video stream 601b and provide this as a digitized video stream 721 to Codec 752 that, among other things, compresses data of digital video stream 721 (e.g., using any suitable compression protocol such as MPEG-2, MPEG-4, H.263, H.264, etc.) to form a second original compressed video stream 722. In this regard, video access component 734 may include processing logic to convert the analog video signals 601b into digital video data, and scale and encode these streams, etc. As shown, video access component 734 is configured to communicate second original compressed video stream 722 to storage media 740 and/or Filter system 736 via internal bus 764 of DVR 730 as will be described further herein.

Still referring to FIG. 7, first original compressed video stream 702 and/or second original video stream 722 may be provided as needed or desired to storage media 740 (e.g., for storage and future playback) and/or video stream filter system 736 that may be configured to process compressed video stream data in a manner, for example, as described and illustrated in relation to FIG. 5 or using any other suitable configuration for producing an altered video stream of reduced data size. In this regard, video stream filter system 736 is coupled to provide at least one altered video stream 614 (i.e., produced from data of first original compressed video stream 702 and/or second original video stream 722) to network interface component 738 that may be present to perform network interface tasks such as buffering, network protocol tasks, flow control, etc. In this regard, network interface component 738 may be configured to communicate altered video stream/s 614 across computer network medium 610, to a viewing client 630 for further processing and display as previously described in relation to FIG. 6.

As illustrated in FIG. 7 storage media 740 may be configured to store compressed original video stream 702 and/or 722, and then to playback stored data from compressed original video stream 702 and/or 722 (e.g., in whole or in part). In such a case, storage media 740 may provide the played back compressed video stream data to video stream Filter system 736 via internal bus 764, which may process the played back compressed video stream data to produce an altered video stream that may be provided across computer network medium 610 to viewing client 630 in a manner similar to that previously described. As further illustrated in FIG. 7, video stream Filter system 736 may be optionally configured to communicate an altered video stream back to internal bus 764, e.g., in order to provide the altered video stream to storage media 740 for storage.

In an alternative embodiment, one or more separate digital video source components (such as digital video source 620a) may be each coupled to deliver one or more digital video streams to a separate video access component that includes a media stream filter via a computer network (not shown). In such an alternative embodiment, at least one of the digital video sources may be a DVR that is configured to record and playback digital video data received from one or more other video sources through such a computer network that links the video source components to the video access component. Thus, such a DVR may provide one or more video streams representing pre-recorded video data obtained from one or more other video sources to the video access component in addition to 'live' video streams.

Figure 8:
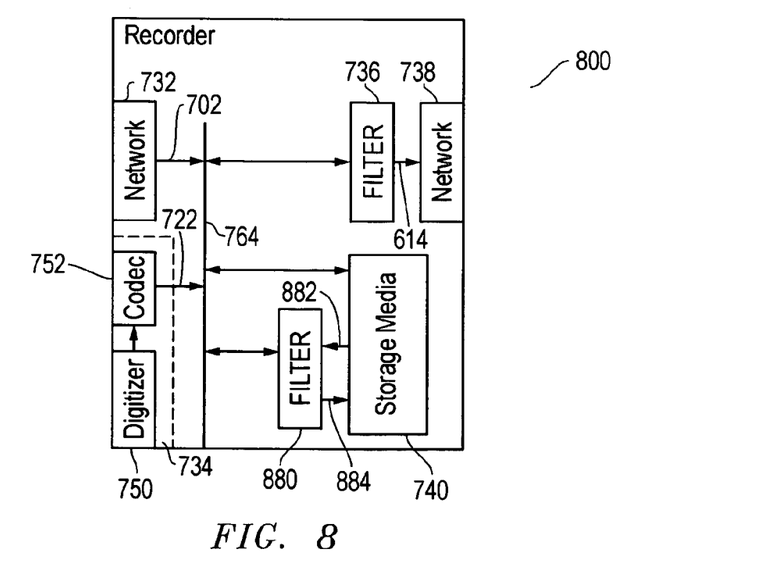
FIG. 8 is a simplified block diagram of a video delivery system according to one embodiment of the disclosed systems and methods.

FIG. 8 illustrates a DVR system 800 as it may be implemented in one exemplary embodiment of the disclosed systems and methods. In this embodiment, DVR 800 is configured similar to DVR 730 of FIG. 7 and may be deployed, for example, in a video delivery system such as system 700 of FIG. 7 or any other suitable video delivery system embodiment. In this regard, DVR system 800 includes storage media 740 that is coupled to receive data (e.g., first original compressed video stream 702 and/or second original compressed video stream 722) from internal bus 764. However, in the illustrated embodiment, DVR system 800 also includes an additional integrated video stream filter system 880 that is coupled between internal bus 764 and storage media 740, and that is capable of receiving and processing data (e.g., first original compressed video stream 702 and/or second original compressed video stream 722) provided from internal bus 764 to produce altered video stream data 884 that may then be provided to storage media 740 (e.g., for recording on storage media 740 without need for recording original compressed video stream 702 on storage media 740). As further illustrated, video stream filter system 880 is also coupled to receive and process original compressed video stream data 882 provided from storage media 740 (e.g., compressed video stream data recorded and played back from storage media 740) to produce altered video stream data that may be provided back to storage media 740 as altered video stream data 884 (e.g., for recording on storage media 740), and/or that may be provided to internal bus 764.

In one embodiment, this capability may be employed to maximize storage space on storage media 740 by reducing the storage space required to contain a particular temporal duration of streaming media. For example, an original compressed video stream 882 of a given temporal duration may be stored on storage media 740 and may take up a first given amount of storage space. Original compressed video stream 882 may be played back from storage media 740 to Filter 880 where it is converted to an altered video stream 884 of reduced data size but same temporal duration as original compressed video stream 882. Altered video stream 884 may then be provided to and recorded on storage media 740 in place of the played-back original compressed video stream 882 (e.g., simultaneously with original stream 882 playback) where it takes up a second given amount of storage space that is less than the first given amount of storage space so as to reduce storage space required to contain the same given temporal duration of video stream events. In one exemplary implementation, disk storage may be extended by recording original compressed media streams to digital storage media at full fidelity. After some criteria is met (e.g., time out, running out of storage space, etc), the original compressed media stream data may be passed through the filter and rewritten to storage as an altered video stream having reduced data size in the manner described above. The original stream may then be deleted. Although some permanent data is lost using this latter methodology, it still leaves some residual data than is still usable and/or that has value, e.g., for an observer. Thus, the algorithms and techniques described herein for the disclosed systems and methods are applicable to both live and stored video streams.

In the embodiment of FIG. 8, media stream Filter 880 may be configured to process original compressed video stream data, for example, as described and illustrated in relation to FIG. 5 or using any other suitable configuration for producing an altered video stream of reduced data size. Furthermore, it will be understood that FIG. 8 is exemplary only, and that one or more media stream filters may be bi-directionally coupled to one or more storage media devices in any other suitable configuration, e.g., configured as integrated and/or non-integrated systems, configured with or without one or more other components of DVR system 800, configured in a manner that is coupled or that is not coupled to a client viewing device/s and/or video source/s, configured as a stand-alone device, configured as part of a client device, combinations thereof, etc.

In another exemplary embodiment of the disclosed systems and methods, media streams that do not employ key frame methodology may be processed, e.g., for processing, delivery and/or storage. For example, current technology for processing audio streams differs somewhat from video stream processing in that most current audio codecs (code/decode logic) do not operate using logic that produces 'key frames' as part of the data stream generation. This is also true for most raw and most non-motion compressed video streams. In such cases, the multimedia streams are instead comprised of autonomous, or independent, data units. In the case of raw video, and the various forms of JPEG, a media stream may be composed of independent video frames; each frame being a completely autonomous image. These frames are defined in several well known formats (e.g., YUV 4:2:2, YCrCb 4:2:0, etc.). For most standard audio protocols, the data units are called 'frames' but in reality are more similar to data samples (i.e., 8-bit quantifiers) with each being autonomous. Specific examples of encoded/compressed audio stream protocols include, but are not limited to, G.711, G.716, G.728, G.722, G.726, G.723.1, G.729, AAC, MP3, etc.

Figure 9:
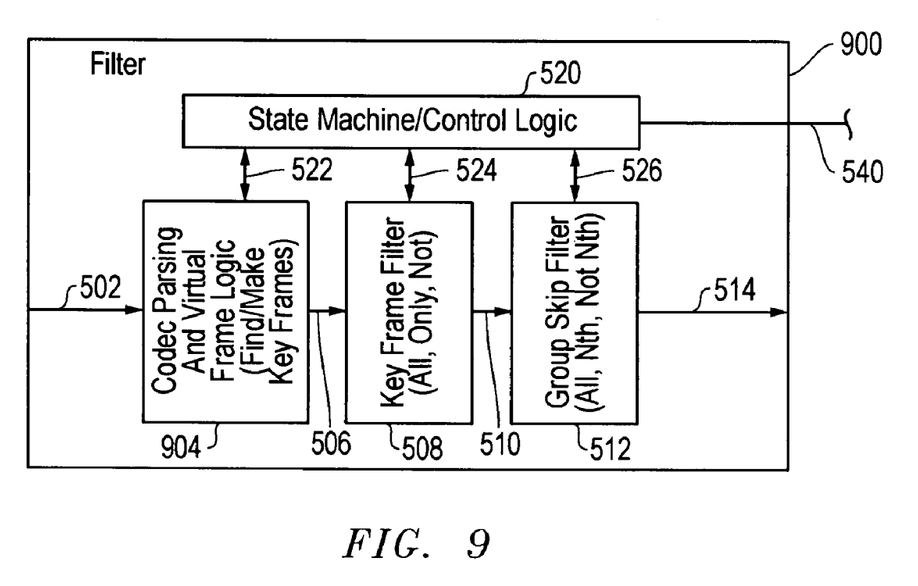
FIG. 9 is a simplified block diagram of a media stream filter system according to one exemplary embodiment of the disclosed systems and methods.

FIG. 9 illustrates a media stream filter system 900 that as it may be implemented in one exemplary embodiment of the disclosed systems and methods to process media streams that are made up of autonomous or independent data units. As may be seen, media stream filter system 900 includes state machine/control logic 520 that is in communication with key frame filter 508, and group skip filter 512. These components have been previously described in relation to media stream filter system 500 of FIG. 5. However, as further illustrated in FIG. 9, system 900 includes codec parsing and Virtual Frame logic 904 that is present to both process key frame containing media streams in a manner similar to Codec Parsing logic 504 of FIG. 5, as well as to process non-key frame containing original media streams by generating virtual frames so that the media stream may be further processed by components 508 and 512 in a manner as previously described in relation to FIG. 5. In one exemplary embodiment, codec parsing and Virtual Frame logic 904 may further operate to tag or mark certain virtual frames of the media stream as key frames.

Still referring to FIG. 9, codec parsing and Virtual Frame logic 904 may use one or more (e.g., a set) of virtual frame identification parameters to identify specific data units within an incoming original compressed media stream 502 that does not include key frames as 'key frames' which are then subsequently processed by key frame filter 508 and group skip filter 512 based on the virtual frame identification parameter/s set by codec parsing and Virtual Frame logic 904. It will be understood that the illustrated configuration of the embodiment of FIG. 9 (like the illustrated configuration of the embodiment of FIG. 5) is exemplary only, and that the disclosed systems and methods may be implemented using any other alternative configuration of logic, hardware, and/or software suitable for processing key frame containing or non-key frame containing media streams in the manner described herein. For example, media stream filter system 900 is configured to process both key frame containing and non-key frame containing media streams. However, it is possible that a media stream filter system may be alternatively configured in an other embodiment to only process non-key frame containing media streams, e.g., by replacing codec parsing and Virtual Frame logic 904 with logic block that only creates virtual frames.

Figure 10:
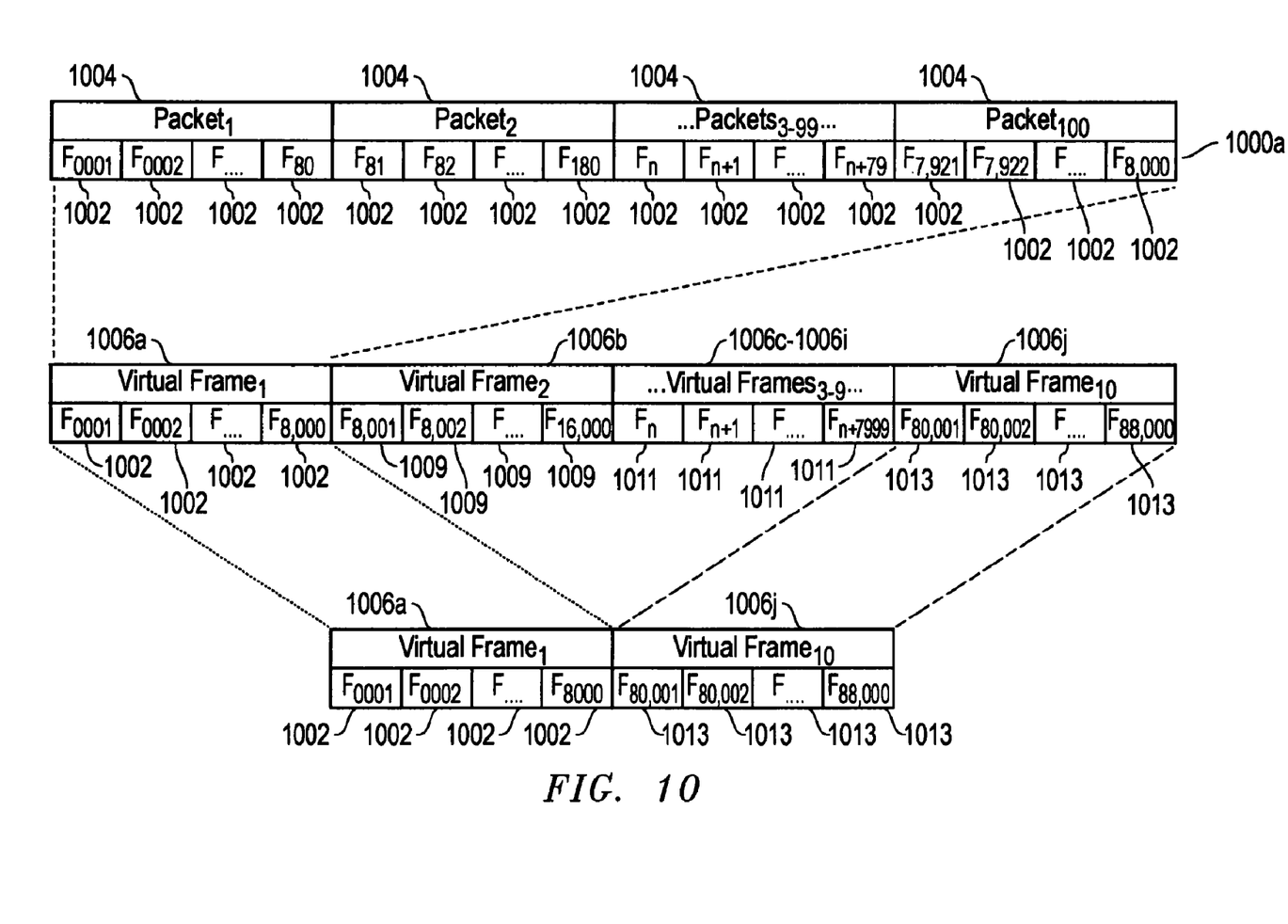
FIG. 10 illustrates an original media stream and an altered media stream according to one embodiment of the disclosed systems and methods.

FIG. 10 depicts an incoming audio stream 1000a according to one exemplary embodiment as it may be sent, for example, over a computer network medium. In this embodiment, audio stream 1000a is comprised of 8-bit 'frames' 1002, hereafter referred to as samples, that are packetized into groups 1004 of 80 frames as depicted in FIG. 10, e.g., with grouping and packetization performed by standards and convention. In this exemplary case, the audio protocol G.711 PCM is chosen for illustration, which has a framing size of 0.125 ms (8000 Hz). G.711 specifies an audio encoding standard comprised of 8000 8-bit samples per second. Therefore, 100 groups (or packets) 1004, equal the temporal equivalent of one second. In this exemplary embodiment, codec parsing and Virtual Frame logic 904 may be configured to accumulate G.711 samples 1002 into buffers that are treated as 'virtual frames' 1006 for subsequent processing by remaining logic within filter 900 of FIG. 9. This may be done, for example, by constructing virtual frames 1006a-1006j from packetized samples 1002. In the illustrated embodiment, this is accomplished by putting 8000 samples or real frames 1002 into each virtual frame 1006a-1006j, so that filter system 900 is configured to pass, for example, one virtual frame 1006 and drop nine virtual frames 1006 in order to achieve a 10:1 frame compression ratio in altered media stream 514 as shown.

In the illustrated embodiment of FIG. 10, virtual frames may be identified, 'marked' or 'tagged', via parameters as 'key frames', or not, based on some set of parameter based criteria. In one example parameters in codec parsing and Virtual Frame logic 904 may be configured to identify a minimum virtual frame size, as previously mentioned, and, potentially, a volume filter that may identify whether a virtual frame is identified, and subsequently processed, as a key frame. A volume filter, as mentioned, may statistically monitor the data value in each, or some set, of data samples and produce a statistical value representing the relative sound, or volume, level. This information may then be applied to a criteria (parameter) that may determine whether the virtual frame should be identified as a key frame, or not, based on that criteria. In this exemplary manner, virtual frames containing silence, or low levels of sound, may be considered non-key frames whereas virtual frames that contain significant sound levels may be considered key frames.

In another exemplary embodiment, the same data stream may solely be processed based on temporal parameters. For example, if in the embodiment of FIG. 10, the virtual frames are built based on one second's worth of audio data. The temporal range of a virtual frame is arbitrary with the exception that, at some point, a set of audio data may be too short in duration to be meaningful. In this case, the codec parsing logic and Virtual Frame logic 904 may be parameterized to identify certain virtual frames as key frames based on temporal factors. This may be driven by a scenario where a media stream is comprised of an audio and video stream each. To accelerate the transmission of the video stream, the corresponding audio stream may be 'filtered' also. However, as has been stated, audio needs some minimum temporal duration, in some cases, to be meaningful. As such, for example, the media stream filter system 900 may set a key frame and skip factor based on a minimum virtual frame size of 4000 samples which, in the present example, may be a half-second. This corresponds to 'n' key frames of the video stream since the audio stream would 'play' in half-second units. So a 30 fps video stream, sent at a rate of 16×, with accompanying audio, may identify every 16th virtual audio frame as a key frame to match the output video stream filtering. In this case, the audio output may be somewhat disjointed, but the context of sound with respect to the corresponding video stream may be maintained. Additionally, for audio scanning, this technique may be implemented to allow large durations of audio to be scanned quickly looking for particular types of sound.

In addition to the above-described audio stream processing embodiment, independent video streams comprised of raw or encoded independent video frames may be processed similarly to the methods described above for video. Frames may be identified by codec parsing and Virtual Frame logic 904, for example, based on temporal parameters, size parameters, derived bit-rate parameters, etc. The method of assigning a key frame value to a video frame based on the temporal frame rate may be particularly useful much like that described for audio above. It will be understood with benefit of this disclosure that many other filtering and identifying methods are possible and that the foregoing examples are exemplary only.

Although particular embodiments have been described herein in which original compressed media streams have been processed to produce altered media streams of reduced size, it will be understood that original non-compressed media streams may be processed using similar methodology employed to process original compressed media streams. In this regard, frames of an original non-compressed (e.g., raw) media stream of a given temporal duration may be removed (e.g., using a pattern that removes every $n^{th}$ frame of the raw media stream, etc.) so as to produce an altered media stream of reduced data size but of substantially the same given temporal duration as the original non-compressed media stream.

Furthermore, it is also possible that the disclosed systems and methods may be implemented so that an original compressed media stream may be delivered normally (e.g., at full temporal fidelity) up to a certain threshold delivery speed (e.g., up to 4× delivery speed), but that a filter methodology is implemented so that altered media streams are delivered when higher delivery speeds are requested or otherwise specified (e.g., for delivery speeds of 8× and higher). Such an embodiment may be implemented, for example, using decision points that may be imposed by static parameters, or logic, or may be imposed dynamically using parameterized conditional logic.

It will be understood that the term 'video stream' is used herein as a logical term. In this regard, a 'video stream' identifies one or more video images, transferred in a logical sequence, that share the same basic attribute, for example, attributes of frame resolution, frame rate, and bit rate. However, it will also be understood that images of a video stream may also share other types of attributes, e.g., a series of video images transferred over the same network connection ('socket'), a series of video images associated with the same source device or file/track, a series of video images that all share the same timespan, a series of video images that are all associated with the same event or set of events, a series of video images that are all within the same specific timespan from the same video source, etc. In this regard, it is not necessary that there be a direct correlation between a specific network connection or session used to transfer video data and a particular video stream.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method for processing streaming media including frames, comprising:
using a filter system to selectively remove at least one frame from the streaming media to form an altered media stream of reduced data size but covering a substantially same given period of real time as the streaming media data, wherein the filter system includes a parsing component for identifying individual frames in the streaming media, a frame filter component for removing individual frames from the streaming media, and a group filter component for removing entire groups of frames from the streaming media; and
transmitting the altered media stream over a computer network medium for storage, delivery to a client, or a combination thereof, such that a speed of delivery of the streaming media is increased without an increase in associated network bandwidth;
wherein using a filter system to selectively remove at least one frame comprises: selecting at least one stream alteration parameter; and applying the at least one selected stream alteration parameter to the streaming media; and
wherein selecting at least one stream alteration parameter comprises selecting at least one of a play parameter and a skip parameter, the play parameter specifying a number of consecutive groups of frames to include in the altered media stream before removing the at least one frame, and the skip parameter specifying a number of consecutive groups of frames to be excluded from the altered media stream.

2. The method of claim 1, wherein the streaming media comprises streaming video; and
wherein said transmitting the altered media stream over a computer network medium occurs in response to a request received by the filter system via the computer network medium, the request comprising at least one stream alteration parameter.

3. The method of claim 1, wherein the streaming media comprises streaming video; and
wherein the client is one of a media stream client and a viewing client.

4. The method of claim 1, wherein the streaming media comprises streaming video; and
wherein said using a filter system to selectively remove at least one frame further comprises selectively removing at least one frame from an original video stream to form an altered video stream of reduced data size.

5. The method of claim 4, wherein the original video stream comprises a compressed video stream that includes key frames and dependent frames; and
wherein said using a filter system to selectively remove at least one frame further comprises removing all the dependent frames from the original video stream to form the altered video stream, the altered video stream comprising only key frames of the streaming media.

6. The method of claim 5, wherein the original video stream comprises a MPEG-4 compressed video stream.

7. The method of claim 5, wherein the original video stream comprises an H.264 compressed video stream.

8. The method of claim 1, wherein the streaming media comprises an original video stream that comprises autonomous data units; and
wherein said using a filter system to selectively remove at least one frame further comprises:
generating virtual frames from the autonomous data units of the original video stream; and
selectively removing at least one virtual frame from the original video stream to form an altered video stream of reduced data size.

9. The method of claim 1, wherein the streaming media comprises streaming video;
wherein said using a filter system to selectively remove at least one frame further comprises:
selectively removing at least one frame from an original video stream of a given temporal fidelity to form a first altered video stream of reduced data size and having reduced temporal fidelity relative to the original video stream;
wherein said transmitting said altered media stream further comprises:
transmitting the first altered video stream over a computer network medium;
receiving the first altered video stream over the computer network medium at a client device;

transmitting at least one removed frame as a second altered video stream over the computer network medium after transmitting the first altered video stream over the computer network medium, the second altered video stream transmitted in response to a request received by the computer processor from the client device across the computer network medium;
wherein the method further comprises:
receiving the second altered video stream over the computer network medium after receiving the first altered video stream over the computer network medium; and
reassembling the first altered video stream with the second altered video stream to form a reassembled video stream having higher temporal fidelity than the first altered video stream.

10. The method of claim 1, wherein selecting at least one stream alteration parameter comprises selecting at least one stream alteration parameter using the client.

11. The method of claim 1, wherein applying the at least one selected stream alteration parameter comprises implementing the selected stream alteration parameter using a real time streaming protocol (RTSP) uniform resources locator (URL).

12. The method of claim 1, wherein selecting at least one stream alteration parameter comprises selecting a mode parameter, the mode parameter specifying which frames within a group of frames should be included in the altered media stream.

13. The method of claim 1, wherein selecting at least one stream alteration parameter comprises selecting a rate parameter, the rate parameter specifying the frame rate at which the altered media stream is transmitted.

* * * * *